(12) United States Patent
Imai

(10) Patent No.: US 8,780,251 B2
(45) Date of Patent: Jul. 15, 2014

(54) IMAGE CAPTURE WITH FOCUS ADJUSTMENT

(75) Inventor: Francisco Imai, Mountain View, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 425 days.

(21) Appl. No.: 12/886,337

(22) Filed: Sep. 20, 2010

(65) Prior Publication Data

US 2012/0069235 A1    Mar. 22, 2012

(51) Int. Cl.
*H04N 5/222* (2006.01)

(52) U.S. Cl.
USPC ............ 348/333.02; 348/333.05; 348/333.12; 348/335; 348/345

(58) Field of Classification Search
USPC ........... 348/333.02, 333.05, 333.12, 335, 345
See application file for complete search history.

(56) References Cited

U.S. PATENT DOCUMENTS

| 6,741,251 | B2 | 5/2004 | Malzbender | |
|---|---|---|---|---|
| 7,620,309 | B2 * | 11/2009 | Georgiev | 396/113 |
| 7,646,550 | B2 | 1/2010 | Rohaly et al. | |
| 8,427,573 | B2 * | 4/2013 | Anderle et al. | 348/346 |
| 2007/0092243 | A1 | 4/2007 | Allen et al. | |
| 2008/0131019 | A1 * | 6/2008 | Ng | 382/255 |
| 2012/0120304 | A1 * | 5/2012 | Corcoran et al. | 348/349 |

OTHER PUBLICATIONS

Moghaddam, et al., "Defining Image Content with Multiple Regions-of-Interest", Proceedings of IEEE Workshop on Content-Based Access of Image and Video Libraries, CVPR99, TR99-10, (Jun. 1999).

* cited by examiner

*Primary Examiner* — Anthony J Daniels
(74) *Attorney, Agent, or Firm* — Fitzpatrick, Cella, Harper & Scinto

(57) ABSTRACT

An image capture device includes capture optics for capturing light-field information for a scene. A display screen displays a preview of the scene by using the captured light-field information at a default focal plane. The display displays a user interface for accepting a user selection of a region in the preview together with a user selection of focus for the selected region.

32 Claims, 8 Drawing Sheets

IMAGE CAPTURE WITH FOCUS ADJUSTMENT

FIELD

The present disclosure relates to adjustment of focus, and more particularly relates to a user interface for adjustment of focus.

BACKGROUND

In the field of digital imaging, it is common to perform focus adjustment, such as by adjusting the focal point of a lens or by adjusting the aperture. By performing focus adjustment, it is ordinarily possible to set the sharpness at which certain objects appear in the captured image.

Conventionally, focus adjustment is such that all objects at the same range will necessarily have the same sharpness. In that regard, objects within a single selected focus will always appear relatively sharp, whereas objects out of the selected focus will always appear relatively fuzzy.

SUMMARY

Recent optical technologies do not merely capture an image of a scene, but rather capture light-field information. Examples of such optical technologies include multi-aperture optics, polydioptric optics, and a plenoptic system. The light-field information of the scene may be obtained in a single capture operation.

Light-field information differs from simple image data in that simple image data is merely a two-dimensional representation of the total amount of light at each pixel of an image, whereas light-field information also includes information concerning the directional lighting distribution at each pixel. In some usages, light-field information is sometimes referred to as four-dimensional.

Because these optics capture light-field information, synthetic images can be constructed computationally, at different focus positions and from different viewpoints.

However, these synthetic images are constructed during post-processing, and are therefore limited to previously-captured light-fields of a scene.

The foregoing is addressed by displaying a preview of a scene for an image capture device, in which a user is provided with a user interface to select and adjust focus for a region in the scene.

Thus, in an example embodiment described herein, an image capture device includes capture optics for capturing light-field information for a scene. A display screen displays a preview of the scene by using the captured light-field information at a default focal plane. The display displays a user interface for accepting a user selection of a region in the preview together with a user selection of focus for the selected region.

By displaying a preview of a scene along with a user interface for selecting and adjusting focus for a region of the scene, it is ordinarily possible to achieve a desired focus for multiple ranges or objects in a scene on-the-fly, while the user is still viewing the scene.

This brief summary has been provided so that the nature of this disclosure may be understood quickly. A more complete understanding can be obtained by reference to the following detailed description and to the attached drawings.

DETAILED DESCRIPTION

Figure 1A:
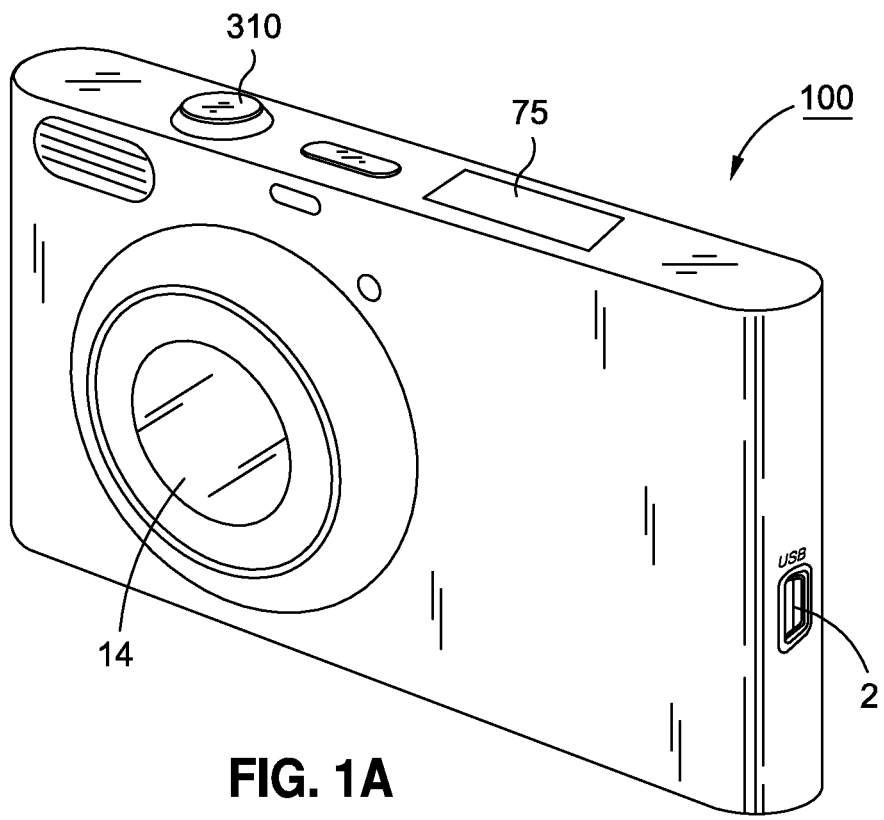
FIGS. 1A and 1B are representative views for explaining the exterior appearance of an image capture device relevant to one example embodiment.
Figure 1B:
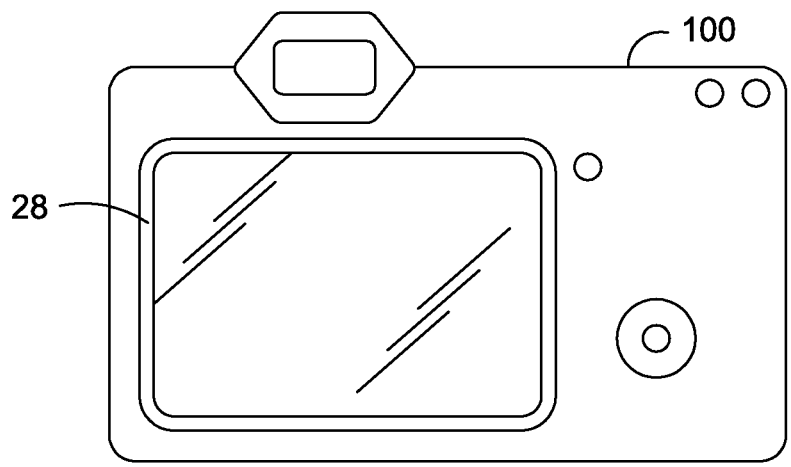

FIGS. 1A and 1B are representative views for explaining the exterior appearance of an image capture device relevant to one example embodiment. In these figures, some components are omitted for conciseness. As shown in FIGS. 1A and 1B, image capture device 100 is constructed as an embedded and hand held device including an image sensor 14 and a connector 2 for connection to external devices. In the embodiment of FIGS. 1A and 1B, interface connector 2 is a USB interface connector, but other wired and wireless interfaces may be used.

Image capture device 100 further includes a variety of user interfaces for permitting a user to interact therewith, such as shutter button 310, an image display unit 28 for displaying menus, thumbnail images, a preview image, and a series of selector buttons for permitting display and selection of menu items, among others.

The image display unit 28 may be a liquid crystal screen. Image display unit 28 is constructed to display a user interface which includes a preview image based on the captured preview image data of the scene, by using captured light-field information. The user interface is also constructed to accept a user designation of a region of interest (ROI) in the preview image, via user manipulation of the user interface. In one example embodiment, the user interface accepts a user selection of a target range for focus for the ROI by displaying on the user interface a focus range of the preview image data and accepting a user manipulation of the focus range.

According to one example embodiment, image display unit 28 displays a user interface for accepting a user selection of a region in the preview together with a user selection of focus (e.g., sharpness, contrast, etc.) for the selected region. Image display unit 28 may further display a user interface for accepting a user selection of an additional region in the preview together with a user selection of focus for the additional selected region, and a controller may affect a re-adjustment based on the additional selection.

While FIGS. 1A and 1B depict one example embodiment of image capture device 100, it should be understood that the image capture device 100 may be configured in the form of, for example, a digital camera, a video camera, or any type of device including a camera, such as a pager, a cellular telephone, a radio telephone, a personal digital assistant (PDA), a Moving Pictures Expert Group Layer 3 (MP3) player, and/or the like.

Figure 2A:
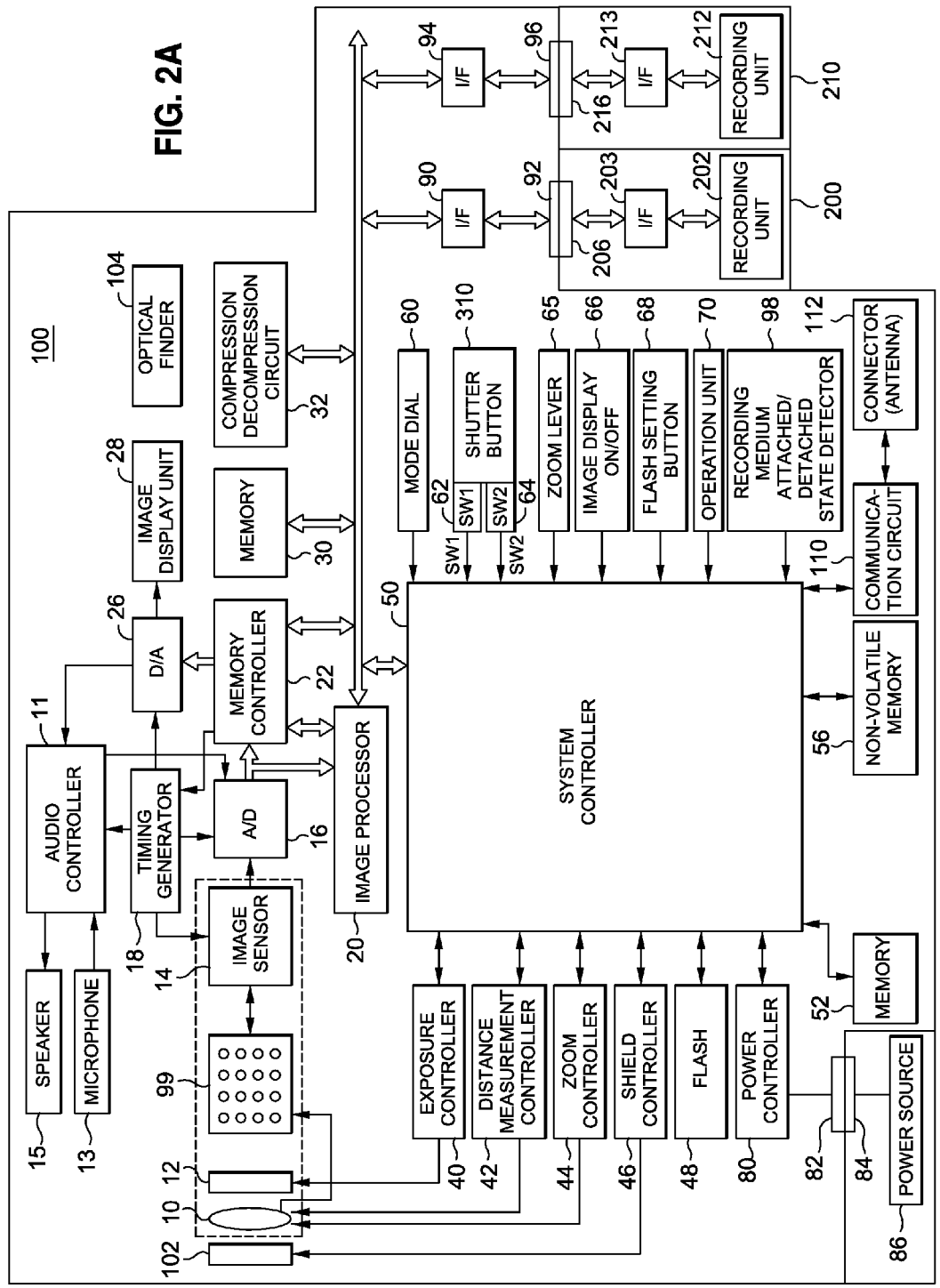
FIGS. 2A and 2B are detailed block diagrams for explaining the internal architecture of the image capture device shown in FIG. 1 according to one example embodiment.

FIG. 2A is a detailed block diagram for explaining the internal architecture of the image capture device 100 shown in FIG. 1 according to one example embodiment. Referring to FIG. 2A, reference numeral 10 denotes an imaging lens; 12, a shutter having an aperture function; and 14, an image sensor, which converts an optical image into an electrical signal. Reference numeral 16 denotes an A/D converter which converts an analog signal into a digital signal. The A/D converter 16 is used when an analog signal output from the image sensor 14 is converted into a digital signal and when an analog signal output from an audio controller 11 is converted into a digital signal. Reference numeral 102 denotes a shield, or barrier, which covers the image sensor including the imaging lens 10 of the image capture device 100 to prevent an image capturing system including the imaging lens 10, shutter 12, and image sensor 14 from being contaminated or damaged.

Light-field information gathering unit 99 captures light-field information. Examples of such units include multi-aperture optics, polydioptric optics, and a plenoptic system. Light-field information differs from simple image data in that image data is merely a two-dimensional representation of the total amount of light at each pixel of an image, whereas light-field information also includes information concerning the directional lighting distribution at each pixel. In some usages, light-field information is sometimes referred to as four-dimensional.

In the present embodiment, imaging lens 10, shutter 12, image sensor 14 and light-field information gathering unit 99 function together to act as a light-field gathering assembly which gathers light-field information of a scene in a single capture operation.

Imaging lens 10 may be of a zoom lens, thereby providing an optical zoom function. The optical zoom function is realized by driving a magnification-variable lens of the imaging lens 10 using a driving mechanism of the imaging lens 10 or a driving mechanism provided on the main unit of the image capture device 100.

A light beam (light beam incident upon the angle of view of the lens) from an object that goes through the imaging lens (image sensing lens) 10 passes through an opening of the shutter 12 having a diaphragm function, into light-field information gathering unit 99, and forms an optical image of the object on the image sensing surface of the image sensor 14. The image sensor 14 converts the optical image to analog image signals and outputs the signals to an A/D converter 16. The A/D converter 16 converts the analog image signals to digital image signals (image data). The image sensor 14 and the A/D converter 16 are controlled by clock signals and control signals provided by a timing generator 18. The timing generator 18 is controlled by a memory controller 22 and a system controller 50.

Image sensor 14 converts optical signals to electrical signals. In particular, image sensor 14 may convert optical signals obtained through the imaging lens 10 into analog signals. Examples of image sensors include a charge-coupled device (CCD) or a complementary metal-oxide-semiconductor (CMOS) active-pixel sensor, although numerous other types of image sensors are possible.

Reference numeral 18 denotes a timing generator, which supplies clock signals and control signals to the image sensor 14, the audio controller 11, the A/D converter 16, and a D/A converter 26. The timing generator 18 is controlled by a memory controller 22 and system controller 50. Reference numeral 20 denotes an image processor, which applies resize processing such as predetermined interpolation and reduction, and color conversion processing to data from the A/D converter 16 or that from the memory controller 22. The image processor 20 executes predetermined arithmetic processing using the captured image data, and the system controller 50 executes exposure control and ranging control based on the obtained arithmetic result.

As a result, TTL (through-the-lens) AF (auto focus) processing, AE (auto exposure) processing, and EF (flash pre-emission) processing are executed. The image processor 20 further executes predetermined arithmetic processing using the captured image data, and also executes TTL AWB (auto white balance) processing based on the obtained arithmetic result. It is understood that in other embodiments, optical finder 104 may be used in combination of the TTL arrangement, or in substitution therefor.

Output data from the A/D converter 16 is written in a memory 30 via the image processor 20 and memory controller 22 or directly via the memory controller 22. The memory 30 stores image data which is captured by the image sensor 14 and is converted into digital data by the A/D converter 16, and image data to be displayed on the image display unit 28. Note that the memory 30 is also used to store audio data recorded via a microphone 13, still images, movies, and file headers upon forming image files. Therefore, the memory 30 has a storage capacity large enough to store a predetermined number of still image data, and movie data and audio data for a predetermined period of time.

A compression/decompression unit 32 compresses or decompresses image data by adaptive discrete cosine transform (ADCT) or the like. The compression/decompression unit 32 loads captured image data stored in the memory 30 in response to pressing of the shutter 310 as a trigger, executes the compression processing, and writes the processed data in the memory 30. Also, the compression/decompression unit 32 applies decompression processing to compressed image data loaded from a detachable recording unit 202 or 212, as described below, and writes the processed data in the memory 30. Likewise, image data written in the memory 30 by the compression/decompression unit 32 is converted into a file by the system controller 50, and that file is recorded in the recording unit 202 or 212, as also described below.

The memory 30 also serves as an image display memory (video memory). Reference numeral 26 denotes a D/A converter, which converts image display data stored in the memory 30 into an analog signal, and supplies that analog signal to the image display unit 28. Reference numeral 28 denotes the image display unit discussed above, which makes display according to the analog signal from the D/A converter 26 on the liquid crystal screen 28 of an LCD display. In this manner, image data to be displayed written in the memory 30 is displayed by the image display unit 28 via the D/A converter 26.

The exposure controller 40 controls the shutter 12 having a diaphragm function based on the data supplied from the system controller 50. The exposure controller 40 may also have a flash exposure compensation function by linking up with a flash (flash emission device) 48. The flash 48 has an AF auxiliary light projection function and a flash exposure compensation function.

The distance measurement controller 42 controls a focusing lens of the imaging lens 10 based on the data supplied from the system controller 50. A zoom controller 44 controls zooming of the imaging lens 10. A shield controller 46 controls the operation of a shield (barrier) 102 to protect the imaging lens 10.

Reference numeral 13 denotes a microphone. An audio signal output from the microphone 13 is supplied to the A/D converter 16 via the audio controller 11 which includes an amplifier and the like, is converted into a digital signal by the A/D converter 16, and is then stored in the memory 30 by the memory controller 22. On the other hand, audio data is loaded from the memory 30, and is converted into an analog signal by the D/A converter 26. The audio controller 11 drives a speaker 15 according to this analog signal, thus outputting a sound.

A nonvolatile memory 56 is an electrically erasable and recordable memory, and uses, for example, an EEPROM. The nonvolatile memory 56 stores constants, computer-executable programs, and the like for operation of system controller 50. Note that the programs include those for execution of various flowcharts.

Figure 2B:
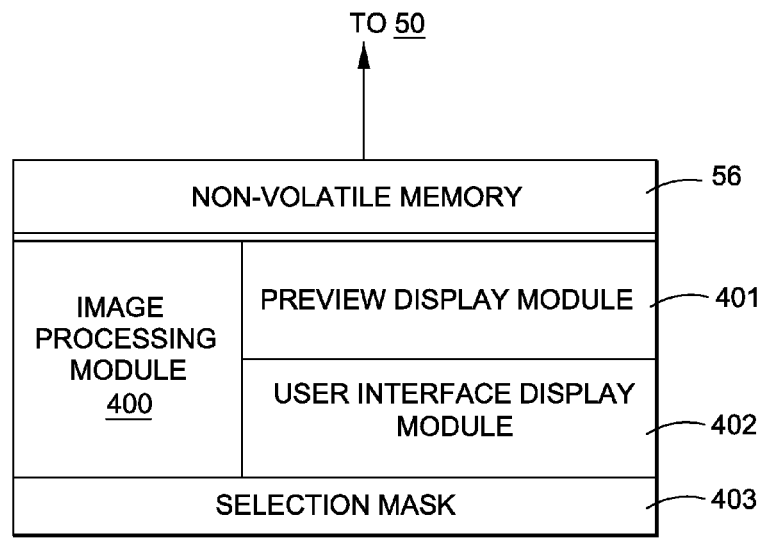

In particular, and as shown in FIG. 2B, non-volatile memory 56 is an example of a non-transitory computer-readable memory medium, having stored thereon image capture module 400 as described herein. According to this example embodiment, the image capture module 400 includes at least a preview display module 401 for displaying a preview of the scene on a display screen of the image capture device, by using the captured light-field information at a default focal plane, and a user interface display module 402 for displaying a user interface for accepting a user selection of a region in the preview together with a user selection of focus for the selected region. These modules will be discussed in more detail below with respect to FIG. 4. Additionally, as shown in FIG. 2B, non-volatile memory 56 also stores a spatial selection mask 403 which maps aperture values for each region of an image. The spatial selection mask 403 may reflect default values for the image, or may be generated to reflect updated aperture values for one or more regions selected and adjusted by the user, as described more fully below.

In addition, non-volatile memory may also store 56 light-field for a scene with a selected focus. In one embodiment, the image data for the scene is stored in non-volatile memory 56 without also storing the light-field information of the scene in the non-volatile memory 56. In particular, in such an example embodiment, the image capture device may store the light-field information in terms of super-pixels comprising one or more pixels, in order to reduce the overall amount of image data for processing.

Reference numeral 50 denotes a system controller, which controls the entire image capture device 100. The system controller 50 executes programs recorded in the aforementioned nonvolatile memory 56 to implement respective processes to be described later of this embodiment. For example, system controller 50 adjusts focus of the selected region based on the user selection of focus and by using light-field information, and causes a display (such as image display unit 28) to display a preview of a scene with the adjusted focus. In one example, system controller 50 generates a spatial selection mask based on the user selection of region and based on the user selection of focus. Adjustment of focus then comprises application of the spatial selection mask to the light-field information.

Reference numeral 52 denotes a system memory which comprises a RAM. On the system memory 52, constants and variables required to operate system controller 50, programs read out from the nonvolatile memory 56, and the like are mapped.

A mode selection switch 60, shutter switch 310, and operation unit 70 form operation means used to input various operation instructions to the system controller 50.

The mode selection switch 60 includes the imaging/playback selection switch, and is used to switch the operation mode of the system controller 50 to one of a still image recording mode, movie recording mode, playback mode, and the like.

The shutter switch 62 is turned on in the middle of operation (half stroke) of the shutter button 310 arranged on the image capture device 100, and generates a first shutter switch signal SW1. Also, the shutter switch 64 is turned on upon completion of operation (full stroke) of the shutter button 310, and generates a second shutter switch signal SW2. The system controller 50 starts the operations of the AF (auto focus) processing, AE (auto exposure) processing, AWB (auto white balance) processing, EF (flash pre-emission) processing, and the like in response to the first shutter switch signal SW1. Also, in response to the second shutter switch signal SW2, the system controller 50 starts a series of processing (shooting) including the following: processing to read image signals from the image sensing device 14, convert the image signals into image data by the A/D converter 16, process the image data by the image processor 20, and write the data in the memory 30 through the memory controller 22; and processing to read the image data from the memory 30, compress the image data by the compression/decompression circuit 32, and write the compressed image data in the recording medium 200 or 210.

A zoom operation unit 65 is an operation unit operated by a user for changing the angle of view (zooming magnification or shooting magnification). The zoom operation unit 65 can be configured with, e.g., a slide-type or lever-type operation member, and a switch or a sensor for detecting the operation of the member.

The image display ON/OFF switch 66 sets ON/OFF of the image display unit 28. In shooting an image with the optical finder 104, the display of the image display unit 28 configured with a TFT, an LCD or the like may be turned off to cut the power supply for the purpose of power saving.

The flash setting button 68 sets and changes the flash operation mode. In this embodiment, the settable modes include: auto, flash-on, red-eye reduction auto, and flash-on (red-eye reduction). In the auto mode, flash is automatically emitted in accordance with the lightness of an object. In the flash-on mode, flash is always emitted whenever shooting is performed. In the red-eye reduction auto mode, flash is automatically emitted in accordance with lightness of an object, and in case of flash emission the red-eye reduction lamp is always emitted whenever shooting is performed. In the flash-on (red-eye reduction) mode, the red-eye reduction lamp and flash are always emitted.

The operation unit 70 comprises various buttons, touch panels and so on. More specifically, the operation unit 70 includes a menu button, a set button, a macro selection button, a multi-image reproduction/repaging button, a single-shot/serial shot/self-timer selection button, a forward (+) menu selection button, a backward (−) menu selection button, and the like. Furthermore, the operation unit 70 may include a forward (+) reproduction image search button, a backward (−) reproduction image search button, an image shooting quality selection button, an exposure compensation button, a date/time set button, a compression mode switch and the like.

The compression mode switch is provided for setting or selecting a compression rate in JPEG (Joint Photographic Expert Group) compression, recording in a RAW mode and the like. In the RAW mode, analog image signals outputted by the image sensing device are digitalized (RAW data) as it is and recorded.

Note in the present embodiment, RAW data includes not only the data obtained by performing A/D conversion on the photoelectrically converted data from the image sensing device, but also the data obtained by performing lossless compression on A/D converted data. Moreover, RAW data indicates data maintaining output information from the image sensing device without a loss. For instance, RAW data is A/D converted analog image signals which have not been subjected to white balance processing, color separation processing for separating luminance signals from color signals, or color interpolation processing. Furthermore, RAW data is not limited to digitalized data, but may be of analog image signals obtained from the image sensing device.

According to the present embodiment, the JPEG compression mode includes, e.g., a normal mode and a fine mode. A user of the image capture device 100 can select the normal mode in a case of placing a high value on the data size of a shot image, and can select the fine mode in a case of placing a high value on the quality of a shot image.

In the JPEG compression mode, the compression/decompression circuit 32 reads image data written in the memory 30 to perform compression at a set compression rate, and records the compressed data in, e.g., the recording medium 200.

In the RAW mode, analog image signals are read in units of line in accordance with the pixel arrangement of the color filter of the image sensing device 14, and image data written in the memory 30 through the A/D converter 16 and the memory controller 22 is recorded in the recording medium 200 or 210.

Note that the image capture device 100 according to the present embodiment has a plural-image shooting mode, where plural image data can be recorded in response to a single shooting instruction by a user. Image data recording in this mode includes image data recording typified by an auto bracket mode, where shooting parameters such as white balance and exposure are changed step by step. It also includes recording of image data having different post-shooting image processing contents, for instance, recording of plural image data having different data forms such as recording in a JPEG form or a RAW form, recording of image data having the same form but different compression rates, and recording of image data on which predetermined image processing has been performed and has not been performed.

A power controller 80 comprises a power detection circuit, a DC-DC converter, a switch circuit to select the block to be energized, and the like. The power controller 80 detects the existence/absence of a power source, the type of the power source, and a remaining battery power level, controls the DC-DC converter based on the results of detection and an instruction from the system controller 50, and supplies a necessary voltage to the respective blocks for a necessary period. A power source 86 is a primary battery such as an alkaline battery or a lithium battery, a secondary battery such as an NiCd battery, an NiMH battery or an Li battery, an AC adapter, or the like. The main unit of the image capture device 100 and the power source 86 are connected by connectors 82 and 84 respectively comprised therein.

The recording media 200 and 210 comprise: recording units 202 and 212 that are configured with semiconductor memories, magnetic disks and the like, interfaces 204 and 214 for communication with the image capture device 100, and connectors 206 and 216. The recording media 200 and 210 are connected to the image capture device 100 through connectors 206 and 216 of the media and connectors 92 and 96 of the image capture device 100. To the connectors 92 and 96, interfaces 90 and 94 are connected. The attached/detached state of the recording media 200 and 210 is detected by a recording medium attached/detached state detector 98.

Note that although the image capture device 100 according to the present embodiment comprises two systems of interfaces and connectors for connecting the recording media, a single or plural arbitrary numbers of interfaces and connectors may be provided for connecting a recording medium. Further, interfaces and connectors pursuant to different standards may be provided for each system.

For the interfaces 90 and 94 as well as the connectors 92 and 96, cards in conformity with a standard, e.g., PCMCIA cards, compact flash (CF) (registered trademark) cards and the like, may be used. In this case, connection utilizing various communication cards can realize mutual transfer/reception of image data and control data attached to the image data between the image capture device and other peripheral devices such as computers and printers. The communication cards include, for instance, a LAN card, a modem card, a USB card, an IEEE 1394 card, a P1284 card, an SCSI card, and a communication card for PHS or the like.

The optical finder 104 is configured with, e.g., a TTL finder, which forms an image from the light beam that has gone through the lens 10 utilizing prisms and mirrors. By utilizing the optical finder 104, it is possible to shoot an image without utilizing an electronic view finder function of the image display unit 28. The optical finder 104 includes indicators, which constitute part of the display device 54, for indicating, e.g., a focus state, a camera shake warning, a flash charge state, a shutter speed, an f-stop value, and exposure compensation.

A communication circuit 110 provides various communication functions such as USB, IEEE 1394, P1284, SCSI, modem, LAN, RS232C, and wireless communication. To the communication circuit 110, a connector 112 can be connected for connecting the image capture device 100 to other devices, or an antenna can be provided for wireless communication.

A real-time clock (RTC, not shown) may be provided to measure date and time. The RTC holds an internal power supply unit independently of the power supply controller 80, and continues time measurement even when the power supply unit 86 is OFF. The system controller 50 sets a system timer using a date and time obtained from the RTC at the time of activation, and executes timer control.

Figure 3A:
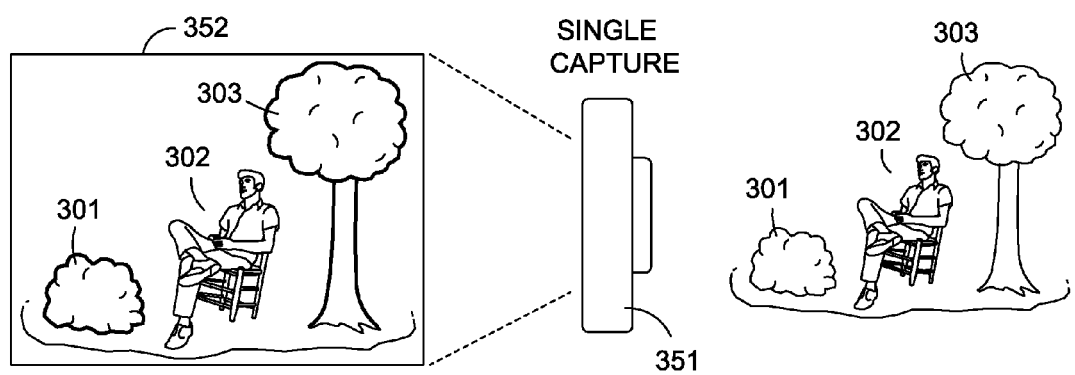
FIGS. 3A and 3B are representative views for explaining the differences between simple pixel information and light-field information.
Figure 3B:
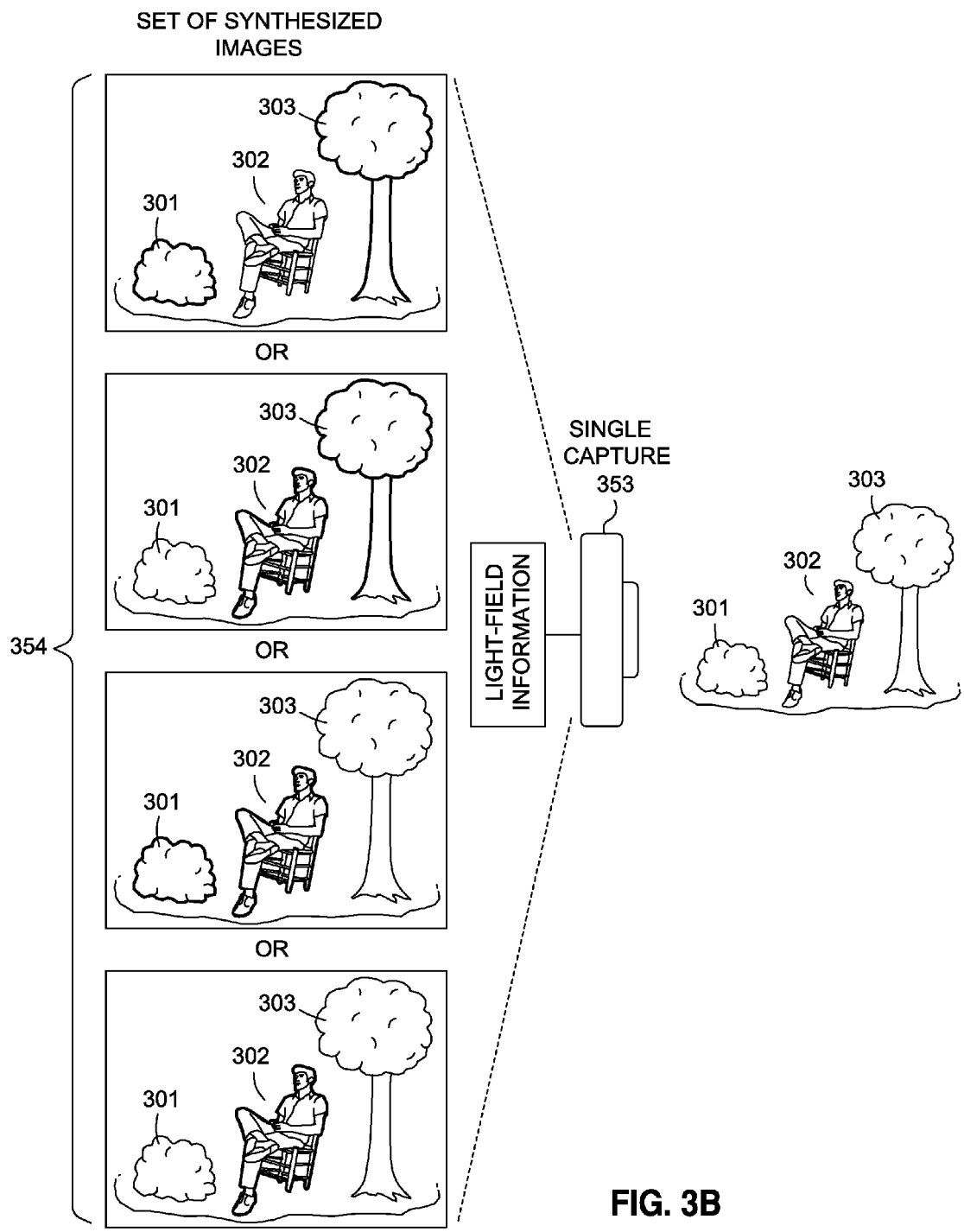

FIGS. 3A and 3B are representative views for explaining the differences between simple image data and light-field information.

In particular, as discussed above, light-field information (e.g., such as that gathered by light-field gathering unit 99) differs from simple image data in that simple image data is merely a two-dimensional representation of the total amount of light at each pixel of an image, whereas light-field information also includes information concerning the directional lighting distribution at each pixel. In some usages, light-field information is sometimes referred to as four-dimensional. Using the light-field information, images at different focus positions and from different viewpoints can be obtained from a single capture operation.

In FIGS. 3A and 3B, a thick line is used to represent a blurry part of an image, whereas a normal line is used to represent a sharp or focused part of the image.

FIG. 3A is a view for explaining focus adjustment using a simple camera 351 to capture simple image data 352. As shown in FIG. 3A, in the image data 352 captured by simple camera 351, the seated man 302 is in focus, whereas the bush 301 and the tree 303 are not. Any objects out of the focus of the seated man 302, such as bush 301 and the tree 303, appear blurry.

However, image data captured by the image capture device 100 and displayed on the image display unit 28 may include regions where the preferable focus varies widely. In such cases, adjusting the focus globally, as in FIG. 3A, may result in certain areas of the image where the focus looks incorrect or not pleasing from an aesthetic point of view.

Thus, in contrast, FIG. 3B is a view for explaining adjustment using a light-field information capture device 353 to capture light-field information 354. The light field information capture device can be used to generate a scene identical to that shown in FIG. 3A. However, since the light-field information also captures images at different focus positions and from different viewpoints, the light-field information can also be used to generate synthesized images where the bush is in focus or where the tree is in focus, all from the same single capture operation. Additionally, the light-field information can be used to construct an image in which, for example, the bush 301 and tree 303 are in focus, but the seated man 302 is not, which would be impossible with a single capture of simple image data. Moreover, objects in the same range from the device (not shown) can have different focuses. Thus, multiple different focuses can be obtained using the light-field information.

Figure 4:
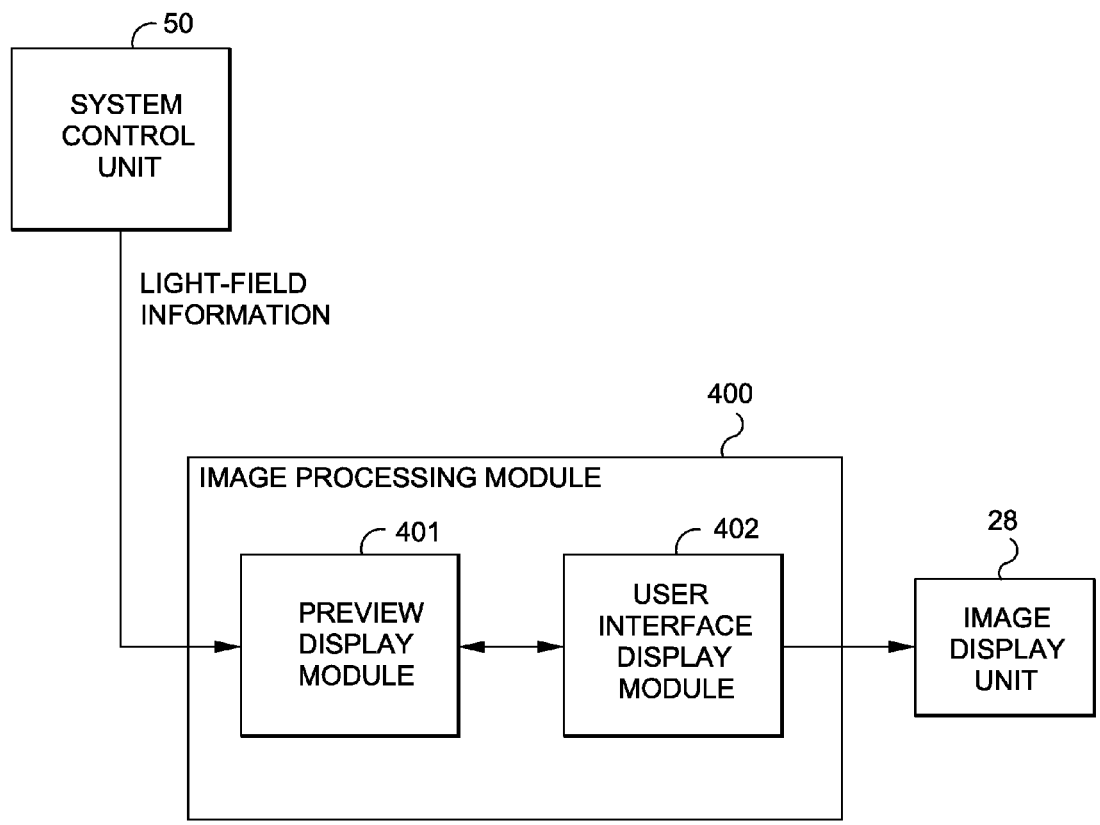
FIG. 4 is a view for explaining an image processing module according to one example embodiment.

FIG. 4 is a view for explaining an image processing module according to one example embodiment. As previously discussed with respect to FIG. 2B, image processing module 400 comprises computer-executable process steps stored on a non-transitory computer-readable storage medium, such as non-volatile memory 56. More or less modules may be used, and other architectures are possible.

As shown in FIG. 4, image processing module 400 includes preview display module 401. Preview display module 401 receives light-field information gathered from light-field information gathering unit 99 via system control unit 50, and communicates with user interface display module 402. In particular, preview display module 401 provides image data to the user interface module 402, so that user interface module 402 can display a user interface on the displayed preview image, as discussed more fully below.

User interface display module 402 displays a user interface on the displayed preview image, so as to allow the user to dynamically select and adjust focus for different regions of the preview image. In that regard, user-interface display module 402 transmits data for a user interface to image display unit 28 for display to the user.

Figure 5:
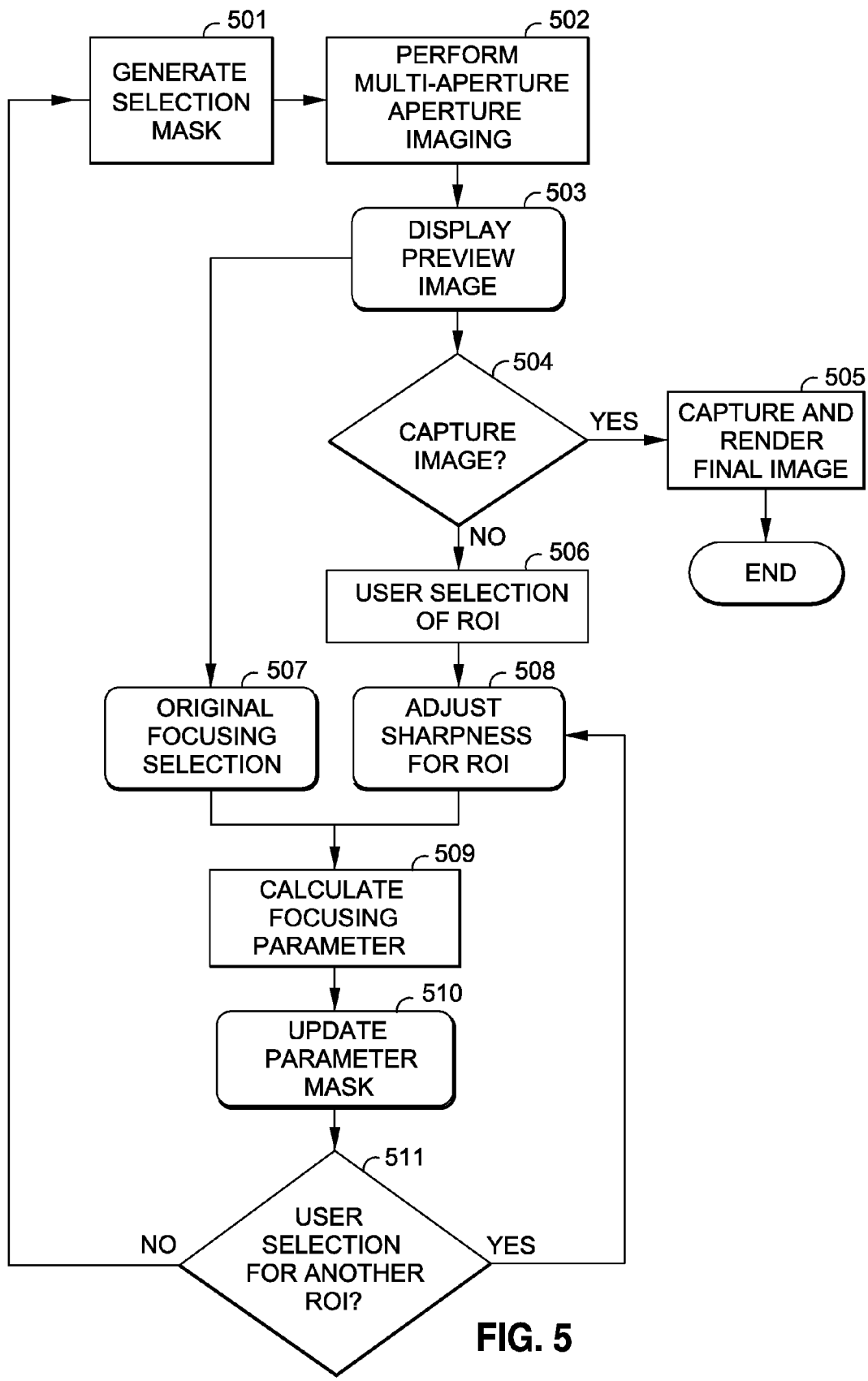
FIG. 5 is a flow diagram for explaining processing in the image capture device shown in FIG. 1 according to an example embodiment.

FIG. 5 is a flow diagram for explaining processing in the image capture device shown in FIG. 1 according to an example embodiment.

Briefly, in FIG. 5, a preview of a scene is displayed on a display screen of the image capture device, by using captured light-field information at a default focal plane. A user interface is displayed, for accepting a user selection of a region in the preview together with a user selection of focus for the selected region.

In more detail, in step 501, a spatial selection mask (e.g., spatial selection mask 403) is generated. In particular, the spatial selection mask indicates aperture values for each region of the image. The spatial selection mask may reflect default values for the image or may be generated to reflect updated aperture values for one or more regions selected and adjusted by the user, as described more fully below and shown from step 511.

Figure 7:
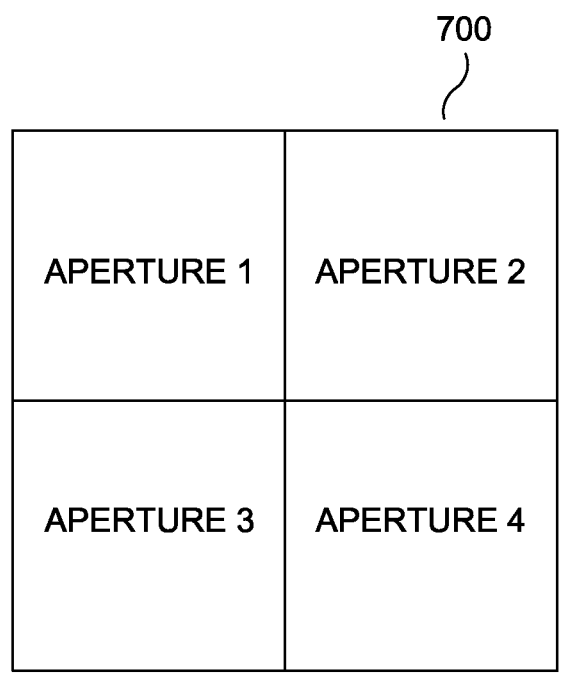
FIG. 7 is a view for explaining a super-pixel according to one example embodiment.

The spatial selection mask managed in terms of super-pixels for each region. Each super-pixel is comprised of a group of pixels, each pixel having a different default aperture, as shown in FIG. 7. Initially, there is an initial selection (default) for each super-pixel of the image, based on imaging auto-exposure.

The super-pixel could be of various sizes, e.g., 4 pixels, 9 pixels, 16 pixels or larger, but as the super-pixel becomes larger, resolution may decrease. Thus, ordinarily a 4-pixel super-pixel will be appropriate. Other geometries could be used for the super-pixel, such as triangular, hexagonal, and other polygonal pixel shapes.

In that regard, the super-pixel reduces the overall amount of processing required, and thus conserves time and processing power. In particular, one aperture is applied to all of the pixels of the super-pixel in a selected region, as discussed more fully below. Thus, the processing occurs in "chunks", rather than individually for each individual pixel. In contrast, processing separate apertures for each individual pixel of an entire image could lead to significant decrease in processing speed. Additionally, the super-pixel be constructed by rearranging captured data. For example, due to the nature of some light-field gathering units, the pixels of the super-pixel may not actually be physically adjacent when captured, and are instead rearranged after capture.

In step 502, the image capture device performs multi-aperture imaging to obtain image data of a scene. The imaging may be ongoing, until the user selects to save the image data of the scene.

Figure 6A:
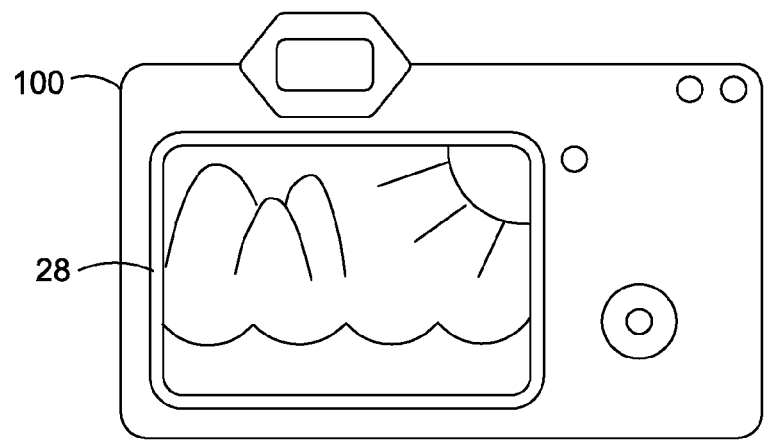
FIG. 6A is a view for explaining display of an image by the image capture device shown in FIG. 1 according to one example embodiment.

In step 503, a preview image is displayed to the user. For example, as shown in FIG. 6A, image capture device 100 may include an image display unit on the back of the digital camera, and a preview image of the scene is displayed to the user. In that regard, after displaying the preview image, the current original selection of focus for one or more regions of the image is also gathered in step 507, for use in calculating a focusing parameter, as discussed more fully below.

In step 504, there is a determination of whether the image is to be permanently captured. For example, the image capture device may determine to permanently capture an image if the user has pressed a shutter button on the image capture device. In that regard, there may also be intermediate selections by the user. For example, the user may be allowed to select an option which indicates that the user is finished with focus adjustment, but does not yet wish to permanently capture the image. If the image is to be permanently captured, the process proceeds to step 505. On the other hand, if the user has not decided to permanently capture the image, the process proceeds to step 506.

In step 505, responsive to the determination that the image is to be permanently captured, the image capture device saves the image data of the scene and renders the final image. The final image may reflect default focus settings if the user has not made any changes to the focus, or may reflect user selection and adjustment of focus settings on different regions of the scene, as discussed more fully below.

In step 506, the user selects a region of interest in which to adjust focus settings. In this example embodiment, when the user designates the ROI in the preview image, the image capture device determines which pixels of the image which are included in the ROI. For example, a spatial filtering algorithm is executed to determine the edges of the ROI. Thus, the user "grabs" a region in units of super-pixels. Alternatively, the illumination of each pixel in the preview image is determined, and pixels having substantially the same illumination are determined to be included in the ROI. Of course, any other suitable algorithms for dividing the image into regions can also be used.

In other example embodiments, the preview image is divided into regions before the user designation of the ROI is accepted. In this case, the user of the image capture device selects the quantity of regions to divide the displayed image. In one embodiment, the number of regions that the image is divided into is based on the number of different focal distances of objects in the scene. In other embodiments, the number of regions the image is divided into is based on the number of different illuminants associated with the scene that is captured. For example, if the displayed image includes two different illuminants, the user divides the image into two regions. In another case, the displayed image may include three different illuminants; the user may divide the image into three regions. From a practical standpoint, the user may typically divide the image between two to six regions, depending on the color balance goals of the user and the various illuminants associated with the displayed image. Additionally, the user may adjust the size of the regions relative to the image displayed.

In step 507, the original selection of focus for one or more regions of the image is also obtained. These values may reflect original default values, or may reflect previous changes by the user. The original selection(s) of focus are used in calculating a focusing parameter for the region, as discussed below with respect to step 509.

In step 508, the user adjusts the sharpness for the selected region of interest. In some example embodiments, the user interface includes ranges for focus parameters, in addition to the preview image. In this case, the range for focus parameters for the preview image, such as histograms or slide bars, can be displayed together with the preview image. In other example embodiments, the focus range is displayed as a slide bar, a dial, a button, or any other type of suitable representation. By manipulating the focus, the user effects the selection of the target range for focus for the region of interest. With this arrangement, the user selects the target range for sharpness/focus for the designated region of interest, typically with ease and simplicity.

In one example embodiment, accepting the user selection of the targeted imaging property for the ROI comprises accepting a user selection of a target range for focus for the ROI. In some embodiments, accepting the selection of the target range for focus comprises displaying on the user interface a focus range of the preview image data, and accepting a user manipulation of the focus range so as to effect the selection of the target range for focus for the ROI. For example, in one example embodiment, the focus range of the preview image data is displayed on the user interface as a focus histogram.

In step 509, a focusing parameter is calculated, based on the user adjustments of sharpness and/or focus of the ROI performed in step 508. In particular, the original focusing selection of the region from step 507 is compared to the user selection of focus for the region in step 508, and a focusing parameter is generated. The focusing parameter may indicate the amount of change that needs to be generated to change the focus from the original default (or previous) focus to the focus selected by the user. For example, the focusing parameter may indicate to blur a particular region by 15%. Thus, according to this example embodiment, a focus change parameter is generated based on a comparison of original foci in the preview image data with the target range of focus for the ROI as selected by the user, and the focus change parameter is compared with the default capture setting so as to compute an updated setting.

In step 510, based on the selected focusing parameter, a parameter mask is updated. The parameter mask map indicates the focusing parameter for each super-pixel in the region of interest (and thus the focusing parameter for the region of interest itself). The parameter mask can then be used to update the spatial selection mask.

In step 511, there is a determination of whether the user has selected another ROI. Specifically, if the user selects another region, the process is repeated and the parameter mask is updated for the selected region of interest. Thus, there is display the user interface for accepting a user selection of an additional region in the preview together with a user selection of focus for the additional selected region, and re-adjustment is effected based on the additional selection.

Otherwise, the process proceeds to step 501 to generate an updated spatial selection mask, reflecting the updated focus selected by the user for one or more regions. In this regard, regardless of the method used for capturing light-field information, the captured image will have a super-pixel with different apertures (and different depth of field) for each pixel in the super-pixel. Returning to FIG. 7, a single super-pixel includes four pixels, each with under a different aperture. The apertures for each pixel of the super-pixel may be predefined in the hardware, defined by a manufacturer or user, or otherwise set at default values.

In step 501, however, based on a LUT or other data indicating correspondence between a focusing parameter and a particular aperture, there is a determination of which aperture in the super-pixel should be selected for all pixels in the super-pixel in order to produce or approach the focus selected by the user, and the electronic spatial selection mask is updated accordingly. Thus, the spatial selection mask (e.g., with multi-state voltages) indicates which aperture is selected for each super-pixel.

More specifically, using the focusing parameter, system controller 50 may interpolate to the aperture of the super-pixel which corresponds most closely to the necessary aperture for the selected focus, and then apply that aperture to all of the pixels in the super-pixel, as well as all of the super-pixels in the region of interest. Thus, for the example super-pixel shown in FIG. 7, the image capture device may determine that "Aperture 4" provides the focus closest to that selected by the user. Accordingly, the Aperture 4 value would be applied to all four pixels of the super-pixels in the ROI.

Thus, in this example embodiment, the default focusing setting and the revised capture setting both comprise a spatial selection mask. In particular, the updated mask comprises a spatial selection mask with differing focus settings in different regions of the mask.

FIG. 6A is a view for explaining display of an image by the image capture device shown in FIG. 1 according to one example embodiment. In particular, a rear view of image capture device 100 having image display unit 28 is provided in FIG. 6A. According to this example embodiment, a user interface which includes a preview image based on captured image data of a scene is displayed on the image display unit 28.

In some cases, image data captured by the image capture device 100 and displayed on the image display unit 28 includes regions where different focus adjustments are desired by the user. Accordingly, adjusting focus globally (e.g., by adjusting a single focus point) may result in certain areas of the image where the imaging property looks incorrect or not pleasing from the user's aesthetic point of view.

Figure 6B:
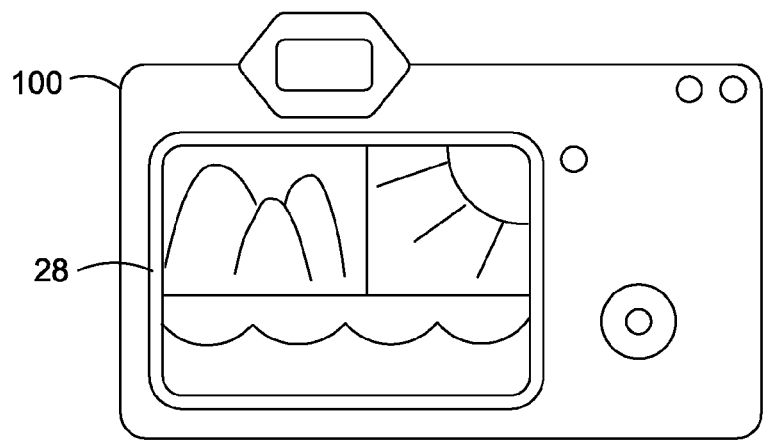
FIG. 6B is a view for explaining a region of interest according to one example embodiment.

FIG. 6B is a view for explaining acceptance of a designation of a region of interest according to one example embodiment. As shown in FIG. 6B, the preview image displayed on the image display unit 28 depicts an image divided into a plurality of regions. In particular, the preview image includes three regions. In one region of the preview image, a landscape of mountains in the background is displayed. In another region, the sun is displayed. In a third region, a body of water is displayed.

The user controlling the image capture device 100 views the image displayed on the image display unit 28 as shown in FIG. 6A, and decides whether an imaging property for at least one of the regions in the image should be adjusted. In this example embodiment, if the user decides to adjust the imaging property for a designated ROI, the image is divided for the user to select and adjust the focus for the designated ROI. For example, if the user decides that the focus for the three different areas of the image should be adjusted, the image is divided into three regions of interest for the user to select and adjust the exposure values.

Figure 6C:
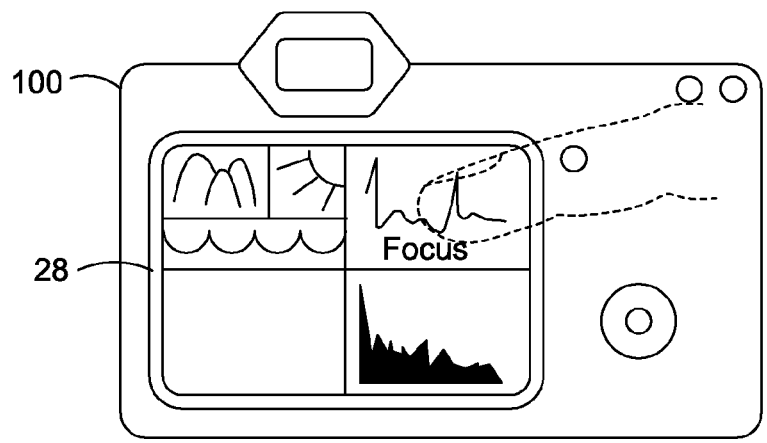
FIG. 6C is a view for explaining acceptance, by the image capture device shown in FIG. 1, of a selection of a focus for a region of interest according to one example embodiment.

Thus, as shown in FIG. 6C, image display unit 28 displays on the user interface an imaging property range of the image data previewed on image display unit 28. By manipulating the focus range as shown in FIG. 6C, the user effects the selection of the focus for the designated region of interest. After the user designates one region of interest and selects a target focus for the designated region, the user may then designate a different region on the image display unit 28.

In one embodiment, ranges for all of the targeted foci to be adjusted are displayed on a single user interface. For example, the user interface displays slide bars representing focus ranges together with a slide bar representing a focus range. Alternatively, selection of targeted foci can be performed in a multi-step process, in which the user interface displays one or any combination of targeted foci to be adjusted.

The user interfaces depicted in FIGS. 6A to 6C are merely examples of user interfaces which can be displayed by the user interface according to this example embodiment. It should be understood that other types of suitable interfaces can also be displayed.

FIG. 7 is a view for explaining a super-pixel according to one example embodiment.

In particular, as discussed above, a single super-pixel includes four pixels, each obtained under a different aperture. In that regard, the super-pixel could be of various sizes, e.g., 4 pixels, 9 pixels, 16 pixels or larger, but as the super-pixel becomes larger, resolution may decrease. Thus, ordinarily a 4-pixel super-pixel will be appropriate. Other geometries could be used for the super-pixel, such as triangular, hexagonal, and other polygonal pixel shapes.

According to other embodiments contemplated by the present disclosure, example embodiments may include a computer processor such as a single core or multi-core central processing unit (CPU) or micro-processing unit (MPU), which is constructed to realize the functionality described above. The computer processor might be incorporated in a stand-alone apparatus or in a multi-component apparatus, or might comprise multiple computer processors which are constructed to work together to realize such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. For these purposes, access to the non-transitory computer-readable storage medium may be a local access such as by access via a local memory bus structure, or may be a remote access such as by access via a wired or wireless network or Internet. The computer processor(s) may thereafter be operated to execute the computer-executable program or program steps to perform functions of the above-described embodiments.

According to still further embodiments contemplated by the present disclosure, example embodiments may include methods in which the functionality described above is performed by a computer processor such as a single core or multi-core central processing unit (CPU) or micro-processing unit (MPU). As explained above, the computer processor might be incorporated in a stand-alone apparatus or in a multi-component apparatus, or might comprise multiple computer processors which work together to perform such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. Access to the non-transitory computer-readable storage medium may form part of the method of the embodiment. For these purposes, access to the non-transitory computer-readable storage medium may be a local access such as by access via a local memory bus structure, or may be a remote access such as by access via a wired or wireless network or Internet. The computer processor(s) is/are thereafter operated to execute the computer-executable program or program steps to perform functions of the above-described embodiments.

The non-transitory computer-readable storage medium on which a computer-executable program or program steps are stored may be any of a wide variety of tangible storage devices which are constructed to retrievably store data, including, for example, any of a flexible disk (floppy disk), a hard disk, an optical disk, a magneto-optical disk, a compact disc (CD), a digital versatile disc (DVD), micro-drive, a read only memory (ROM), random access memory (RAM), erasable programmable read only memory (EPROM), electrically erasable programmable read only memory (EEPROM), dynamic random access memory (DRAM), video RAM (VRAM), a magnetic tape or card, optical card, nanosystem, molecular memory integrated circuit, redundant array of independent disks (RAID), a nonvolatile memory card, a flash memory device, a storage of distributed computing systems and the like. The storage medium may be a function expansion unit removably inserted in and/or remotely accessed by the apparatus or system for use with the computer processor(s).

This disclosure has provided a detailed description with respect to particular representative embodiments. It is understood that the scope of the appended claims is not limited to the above-described embodiments and that various changes and modifications may be made without departing from the scope of the claims.

What is claimed is:

1. An image capture device comprising:
   multi-aperture imaging optics for capturing a representation of light-field information of a scene;
   a display screen for displaying a preview of the scene, by using the captured representation of the light-field information at a default focal plane,
   wherein the display screen is further constructed to display a user interface for accepting a user selection of multiple regions of interest in the preview, together with a user selection of focus for each selected region of interest,
   and wherein a second representation of light-field information of the scene is captured according to the user selection of focus for each selected region.

2. The image capture device according to claim 1, further comprising a controller for adjusting focus of the selected regions based on the user selections of focus and by using the light-field information, and for causing the display to display a preview of the scene with the adjusted focus.

3. The image capture device according to claim 2,
wherein the controller generates a spatial selection mask based on the user selection of regions and based on the user selections of focus, and
wherein adjustment of focuses comprises application of the spatial selection mask to the light-field information.

4. The image capture device according to claim 2, wherein the display is further constructed to display the user interface for accepting a user selection of an additional region in the preview together with a user selection of focus for the additional selected region, and
wherein the controller effects a re-adjustment based on the additional selection.

5. The image capture device according to claim 2, further comprising a memory in which image data for the scene with the selected foci is stored.

6. The image capture device according to claim 5, wherein the image data for the scene is stored in the memory without also storing the light-field information of the scene in the memory.

7. The image capture device according to claim 1, wherein the capture optics comprise polydioptric optics.

8. The image capture device according to claim 1, wherein the capture optics comprise a plenoptic system.

9. A method of focal adjustment for an image capture device, comprising:
capturing a representation of light-field information of a scene through multi-aperture imaging optics;
displaying a preview of the scene on a display screen of the image capture device, by using the captured representation of the light-field information at a default focal plane;
displaying a user interface for accepting a user selection of multiple regions of interest in the preview, together with a user selection of focus for each selected region of interest; and
capturing a second representation of light-field information of the scene according to the user selection of focus for each selected region.

10. The method according to claim 9, wherein the image capture device further comprises a controller for adjusting focus of the selected regions based on the user selections of focus and by using the light-field information, and for causing the display to display a preview of the scene with the adjusted focus.

11. The method according to claim 10,
wherein the controller generates a spatial selection mask based on the user selection of regions and based on the user selections of focus, and
wherein adjustment of focuses comprises application of the spatial selection mask to the light-field information.

12. The method according to claim 10, further comprising a step of displaying the user interface for accepting a user selection of an additional region in the preview together with a user selection of focus for the additional selected region,
wherein the controller effects a re-adjustment based on the additional selection.

13. The method according to claim 10, wherein the image capture device further comprises a memory in which image data for the scene with the selected foci is stored.

14. The method according to claim 13, wherein the image data for the scene is stored in the memory without also storing the light-field information of the scene in the memory.

15. The method according to claim 9, wherein the capture optics comprise polydioptric optics.

16. The method according to claim 9, wherein the capture optics comprise a plenoptic system.

17. An image processing module for an image capture device, comprising:
multi-aperture imaging optics for capturing a representation of light-field information of a scene;
a preview display module for displaying a preview of the scene on a display screen of the image capture device, by using the captured representation of the light-field information at a default focal plane;
a user interface display module for displaying a user interface for accepting a user selection of multiple regions of interest in the preview, together with a user selection of focus for each selected region of interest; and
a capture module for capturing a second representation of light-field information of the scene according to the user selection of focus for each selected region.

18. The image processing module according to claim 17, wherein the image capture device further comprises a controller for adjusting focus of the selected regions based on the user selections of focus and by using the light-field information, and for causing the display to display a preview of the scene with the adjusted focus.

19. The image processing module according to cm 18,
wherein the controller generates a spatial selection mask based on the user selection of regions and based on the user selections of focus, and
wherein adjustment of focuses comprises application of the spatial selection mask to the light-field information.

20. The image processing module according to claim 18, further comprising an additional selection display module for displaying the user interface for accepting a user selection of an additional region in the preview together with a user selection of focus for the additional selected region, and
wherein the controller effects a re-adjustment based on the additional selections.

21. The image processing module according to claim 18, wherein the image capture device further comprises a memory in which image data for the scene with the selected foci is stored.

22. The image processing module according to claim 21, wherein the image data for the scene is stored in the memory without also storing the light-field information of the scene in the memory.

23. The image processing module according to claim 17, wherein the capture optics comprise polydioptric optics.

24. The image processing module according to claim 17, wherein the capture optics comprise a plenoptic system.

25. A computer-readable storage medium storing computer-executable process steps for performing a method of focal adjustment for an image capture device, the method comprising:
capturing a representation of light-field information of a scene through multi-aperture imaging optics;
displaying a preview of the scene on a display screen of the image capture device, by using the captured representation of the light-field information at a default focal plane;
displaying a user interface for accepting a user selection of multiple regions of interest in the preview, together with a user selection of focus for each selected region of interest; and
capturing a second representation of light-field information of the scene according to the user selection of focus for each selected region.

26. The computer-readable storage medium according to claim 25, wherein the image capture device further comprises a controller for adjusting focus of the selected regions based on the user selections of focus and by using the light-field information, and for causing the display to display a preview of the scene with the adjusted focus.

27. The computer-readable storage medium according to claim 26,
wherein the controller generates a spatial selection mask based on the user selection of regions and based on the user selections of focus, and
wherein adjustment of focuses comprises application of the spatial selection mask to the light-field information.

28. The computer-readable storage medium according to claim 26, further comprising an additional selection display module for displaying the user interface for accepting a user selection of an additional region in the preview together with a user selection of focus for the additional selected region, and wherein the controller effects a re-adjustment based on the additional selections.

29. The computer-readable storage medium according to claim 26, wherein the image capture device further comprises a memory in which image data for the scene with the selected foci is stored.

30. The computer-readable storage medium according to claim 29, wherein the image data for the scene is stored in the memory without also storing the light-field information of the scene in the memory.

31. The computer-readable storage medium according to claim 25, wherein the capture optics comprise polydioptric optics.

32. The computer-readable storage medium according to claim 25, wherein the capture optics comprise a plenoptic system.

* * * * *